United States Patent
Tsuchiya et al.

(10) Patent No.: US 7,815,891 B2
(45) Date of Patent: Oct. 19, 2010

(54) DEVICE AND METHOD FOR PRODUCING HYDROGEN

(75) Inventors: Yumiko Tsuchiya, Kanagawa (JP); Fumihisa Kano, Kanagawa (JP); Norihisa Saito, Kanagawa (JP); Seiji Fujiwara, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 714 days.

(21) Appl. No.: 11/652,151

(22) Filed: Jan. 11, 2007

(65) Prior Publication Data

US 2007/0231253 A1 Oct. 4, 2007

(30) Foreign Application Priority Data

Jan. 12, 2006 (JP) .............................. 2006-004355
Jul. 26, 2006 (JP) .............................. 2006-202924

(51) Int. Cl.
*B01J 19/02* (2006.01)
*C01B 3/02* (2006.01)
*C01B 3/22* (2006.01)
*C01B 3/24* (2006.01)
*C01B 3/26* (2006.01)

(52) U.S. Cl. ........................... 423/648.1; 165/DIG. 51; 422/177; 422/197; 422/240; 422/241; 423/652

(58) Field of Classification Search ................ 422/240, 422/241, 177, 197; 423/648.1, 652; 48/61

See application file for complete search history.

(56) References Cited

U.S. PATENT DOCUMENTS

| 4,161,510 | A | * | 7/1979 | Edridge | 422/197 |
| 5,112,580 | A | * | 5/1992 | Ajioka et al. | 422/241 |
| 5,558,783 | A | * | 9/1996 | McGuinness | 210/761 |
| 5,595,719 | A | * | 1/1997 | Ul-Haque et al. | 423/418.2 |
| 5,932,182 | A | * | 8/1999 | Blaney | 422/240 |
| 7,264,782 | B2 | * | 9/2007 | Nougier et al. | 422/198 |
| 7,311,979 | B2 | * | 12/2007 | Mancini et al. | 428/448 |
| 7,326,469 | B2 | * | 2/2008 | Dye et al. | 428/448 |
| 2001/0002248 | A1 | * | 5/2001 | Ukai et al. | 423/652 |

FOREIGN PATENT DOCUMENTS

| JP | 05-213602 | 8/1993 |
| JP | 2005-170707 | 6/2005 |
| JP | 2005-289740 | 10/2005 |

* cited by examiner

*Primary Examiner*—Wayne Langel
(74) *Attorney, Agent, or Firm*—Foley & Lardner LLP

(57) ABSTRACT

A hydrogen manufacturing apparatus for manufacturing hydrogen by utilizing heat generated in a nuclear plant. The apparatus has a heat exchanger or steam reformer to be brought into contact with cooling water containing tritium produced from the nuclear plant and a tritium permeation suppressing ceramic coating at least either the outer surface or the inner surface of the heat exchanger or steam reformer for suppressing permeation of tritium. Instead of coating with a tritium permeation suppressing ceramic, a structure prepared by combining at least two types of materials having different crystal structures may be used.

9 Claims, 9 Drawing Sheets

DEVICE AND METHOD FOR PRODUCING HYDROGEN

CROSS REFERENCE TO RELATED APPLICATIONS

This application is based upon and claims the benefit of priority from the prior Japanese Patent Applications No. 2006-004355, filed on Jan. 12, 2006, and No. 2006-202924, filed on Jul. 26, 2006, the entire contents of which are incorporated herein by reference.

BACKGROUND OF THE INVENTION

The present invention relates to a hydrogen manufacturing apparatus and a method thereof for manufacturing hydrogen, while suppressing permeation of tritium.

Recently, hydrogen is manufactured by using fossil resources as energy sources or fossil resources as raw material. This is contradictory to the idea of introducing hydrogen energy in order to utilize energy that is friendly to the environment because of not discharging carbon dioxide and so on. To dissolve this contradiction, it is necessary to manufacture hydrogen by using only natural energy and atomic power as energy sources and water as raw material.

As a method to do so, manufacturing hydrogen by utilizing atomic energy is attracting attention. Research and development efforts has been paid for manufacturing hydrogen by means of high temperature gas reactor as the most promising manufacturing method (see, for example, Japanese Patent Publication Numbers Hei 5-213602 (A), 2005-170707 (A) and 2005-289740 (A), (the entire contents of which are incorporated herein by reference)).

Heat discharged from a high temperature gas reactor is subjected to heat exchange with secondary helium gas by way of an intermediate heat exchanger. Heat collected by the intermediate heat exchanger is used as heat source for steam reforming reactions of methane, steam manufacturing and so on.

On the other hand, steam reforming reactions are conducted in steam reformers. A plurality of reaction tubes are suspended in the inside of a steam reformer. Secondary helium gas is made to flow outside the reaction tubes. Process gas, or the raw material gas and the generated gas flow inside the reaction tubes. As the process gas in the inside of the reaction tubes are heated by secondary helium gas flowing outside the reaction tubes, it is thermo-chemically decomposed to produce hydrogen.

The above-described reaction technique can be applied to reactors for the Iodine-Sulfur (IS) process that is another hydrogen manufacturing method. With the IS process, water is thermo-chemically decomposed to produce hydrogen as iodine and sulfuric acid are made to internally circulate.

As described above, heat produced from a nuclear plant is utilized to manufacture hydrogen. Tritium that is an isotopic element of hydrogen is produced when manufacturing hydrogen. Tritium is an radioactive element and can adversely affect human bodies so that it is necessary to confine tritium within the plant as much as possible without discharging tritium to the outside of the plant.

However, tritium has a property of permeating solid walls. Tritium can pass through the heat conductor tubes of intermediate heat exchangers and the catalyst tubes of steam reformers to become mixed with manufactured hydrogen.

These apparatus are required to be strong, manufacturable and anti-corrodible and hence it is desirable that they are made of metal.

However, since tritium can permeate metal, measures have to be taken to suppress permeation of tritium.

In view of the above-identified problems, it is therefore the object of the present invention to provide a hydrogen magnification apparatus and a method thereof that can manufacture hydrogen, suppressing permeation of tritium through metal-made internal structures such as piping that tritium can permeate.

BRIEF SUMMARY OF THE INVENTION

To achieve the object described above, the present invention provides a hydrogen manufacturing apparatus for manufacturing hydrogen by utilizing heat generated in a nuclear plant, the apparatus comprising: a metal-made internal structure to be brought into contact with coolant containing tritium produced from the nuclear plant; and a tritium permeation suppressing ceramic coating at least either the outer surface or the inner surface of the metal-made internal structure for suppressing permeation of the tritium.

To achieve the object described above, the present invention further provides a method of manufacturing hydrogen by utilizing heat generated in a nuclear plant, the method comprising a tritium introduction step of introducing a cooling material containing tritium produced from the nuclear plant into a metal-made internal structure; and a tritium permeation suppression step of suppressing permeation of the introduced tritium by way of a permeation suppressing ceramic coated on at least either the inner surface or the outer surface of the metal-made internal structure.

To achieve the object described above, the present invention further provides a hydrogen manufacturing apparatus comprising: a heat exchanger for exchanging heat supplied from a nuclear plant; and a steam reformer for manufacturing hydrogen, using heat obtained by the heat exchange of the heat exchanger; the internal structures in the heat exchanger and the steam reformer to be brought into contact with cooling water containing tritium being prepared by using a metal material prepared by combining at least two types of materials having different crystal structures or a metal material having an oxide film coat adhering thereto.

To achieve the object described above, the present invention further provides a method of manufacturing hydrogen comprising: a heat exchange step of exchanging heat supplied from a nuclear plant by means of a heat exchanger; a steam manufacturing step of manufacturing hydrogen by means of a steam reformer, utilizing heat obtained by the heat exchange of the heat exchanger; and a tritium permeation suppression step of suppressing permeation of tritium by flowing a fluid containing tritium in an internal structure of a heat exchanger or a steam reformer prepared by using a metal material prepared by combining at least two types of materials having different crystal structures or a metal material having an oxide film coat adhering thereto.

DETAILED DESCRIPTION OF THE INVENTION

Now, preferred embodiments of hydrogen manufacturing apparatus and method thereof will be described by referring to the accompanying drawings. Throughout the drawings, the same or similar components are denoted by the same common reference symbols and will not be described repeatedly.

Figure 1:
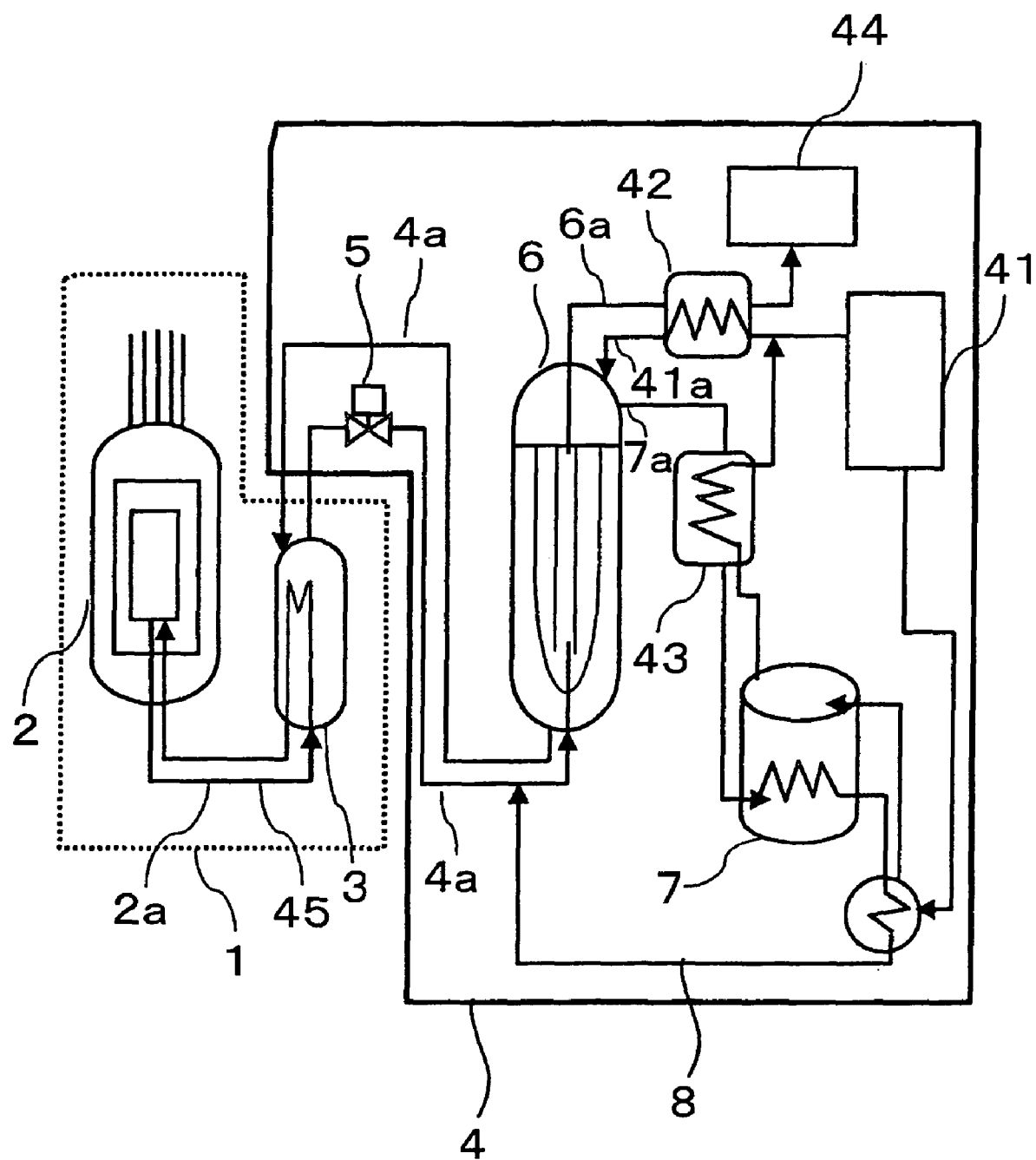
FIG. 1 is a schematic block diagram of an embodiment of hydrogen manufacturing apparatus according to the present invention that utilizes a high temperature gas reactor.

FIG. 1 is a schematic block diagram of a first embodiment of hydrogen manufacturing apparatus 4 according to the present invention that utilizes a high temperature gas reactor 2. In FIG. 1, the area enclosed by a dotted line is a nuclear plant 1 and the area enclosed by solid lines is a hydrogen manufacturing apparatus 4.

In the nuclear plant 1, typically primary system helium gas 2a heated to about 950 deg C. and coming from the high temperature gas reactor 2 is utilized as heat source. Primary system helium gas 2a is introduced into an intermediate heat exchanger 3. Then, primary system helium gas 2a exchanges heat with secondary system helium gas 4a fed from the hydrogen manufacturing apparatus 4 in the intermediate heat exchanger 3 and the secondary system helium gas 4a that is heated as a result of heat exchange is then fed to a steam reformer 6 by way of a high temperature isolation valve 5.

Raw material gas 41a such as methane is introduced into the steam reformer 6 from a raw material gas storage tank 41 by way of a heat exchanger 42. Water 7a is also introduced into the steam reformer 6 from a steam generator 7 by way of another heat exchanger 43. Hydrogen 6a is manufactured in the steam reformer 6 as the raw material gas 41a and the water 7a introduced into it are heated by the secondary system helium gas 4a. The manufactured hydrogen 6a is supplied to a hydrogen storage tank 44 by way of the heat exchanger 42. The primary system helium gas 2a discharged from the above-described high temperature gas reactor 2 contains tritium 45 produced as a result of neutron irradiation in the high temperature gas reactor 2.

As described above, heat discharged from the high temperature gas reactor 2 is transmitted to the secondary system helium gas 4a by way of the intermediate heat exchanger 3 by heat exchange. The heat collected by the intermediate heat exchanger 3 is then used as heat source for the steam reforming reaction of the raw material gas 41a such as methane, for manufacturing steam and so on by way of the heat exchangers 42, 43.

Figure 2:
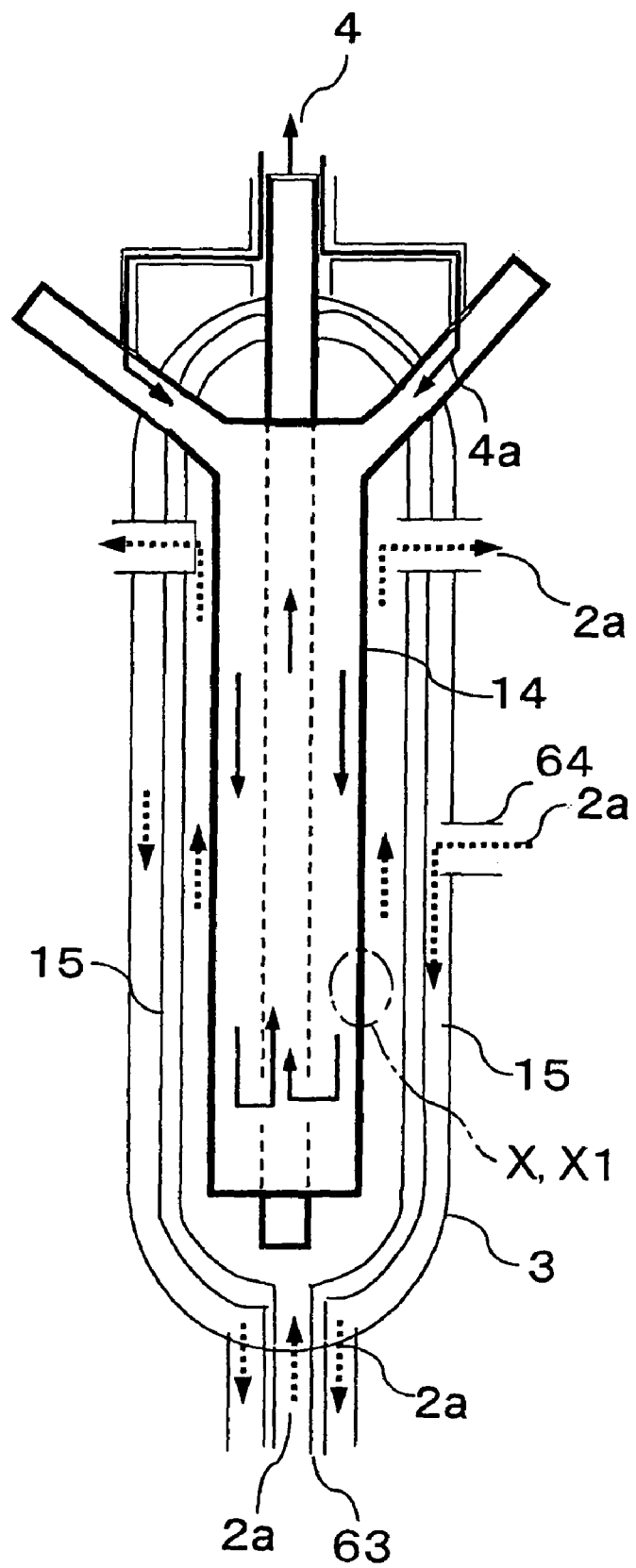
FIG. 2 is a schematic longitudinal cross sectional view of the intermediate heat exchanger of FIG. 1.

FIG. 2 is a schematic longitudinal cross sectional view of the intermediate heat exchanger 3 of FIG. 1.

As shown in FIG. 2, the secondary system helium gas 4a is supplied to a central part of the intermediate heat exchanger 3 by way of a secondary system helium gas flow channel 14 that is a metal-made internal structure. On the other hand, high temperature primary system helium gas 2a is supplied from a lower part 63 and a middle part 64 of the intermediate heat exchanger 3 to the inner wall side of the intermediate heat exchanger 3 by way of a primary system helium gas flow channel 15.

The high temperature primary system helium gas 2a is brought into contact with the secondary system helium gas 4a by way of a partition wall as it flows along the inner wall side for heat exchanger. Tritium existing in the primary system helium gas 2a most probably moves into the secondary system helium gas 4a at this time. In this embodiment, the metal-made internal structure (illustrated by thick solid lines) that constitutes the secondary system helium gas flow channel 14 is coated with tritium diffusion suppressing ceramic such as amorphous ceramic that suppresses diffusion of tritium at least either the inner surface or the outer surface thereof.

Figure 3:
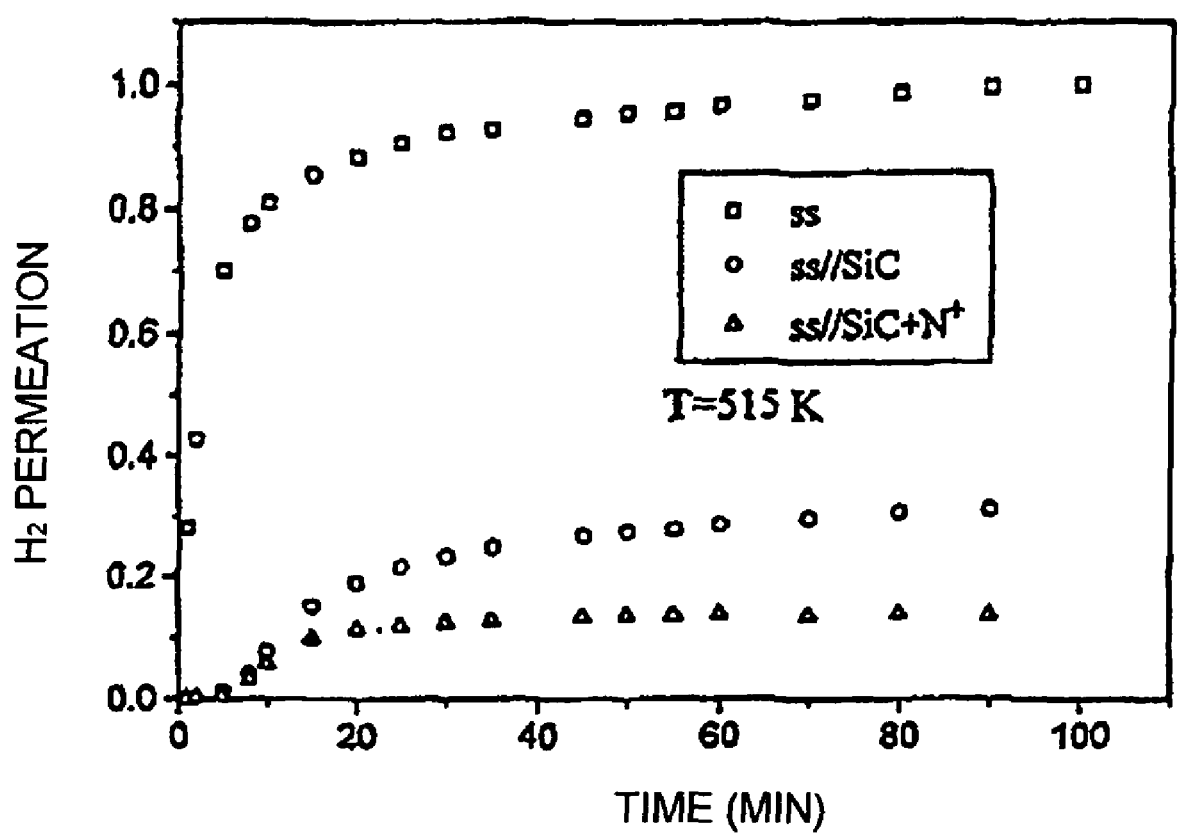
FIG. 3 is a graph showing some of the results of comparing metal and metal with amorphous SiC adhering thereto for hydrogen permeation.

Now, a comparison of metal and metal with ceramic adhering thereto that is made for hydrogen permeation will be described. FIG. 3 is a graph showing some of the results of comparing metal (stainless steel: SS) "□", metal (stainless steel) with amorphous SiC adhering thereto (SS//SiC) "○" and metal with amorphous SiC adhering thereto and $N^+$ injected to the area of adhesion (SS//SiC+$N^+$) "Δ" for hydrogen permeation. As seen from the graph, the tritium permeability is apparently low or for metal coated with amorphous SiC and lower for metal with injected $N^+$ if compared with metal. Thus, diffusion of tritium is effectively suppressed.

As described above, it is possible to suppress movement of tritium by coating at least either the inner surface or the outer surface of the secondary system helium gas flow channel 14, which is a metal-made internal structure illustrated by thick solid lines in FIG. 2, or by injecting $N^+$ to the inner surface of the coating.

For the above-described structure, a material selected from stainless steel such as SUS316L (Japanese Industrial Standards; a type of austenite stainless steel), Ni-based alloys such as Hasteloy (trade name), Ti and Ti alloys is preferably used from the viewpoint of strength and corrosion resistance. A ceramic material selected from SiC, $Al_2O_3$ or $ZrO_4$ is preferably used for the coating because such materials show low tritium permeability.

With this embodiment, it is possible to suppress movement of tritium into the secondary system helium gas 4a by coating the surface of the metal-made internal structure that constitutes the secondary system helium gas flow channel 14 of the intermediate heat exchanger 3 with a ceramic material that suppresses diffusion of tritium such as amorphous ceramic or by injecting $N^+$ to the area of adhesion area between the metallic internal structure and the cramics.

Figure 4A:
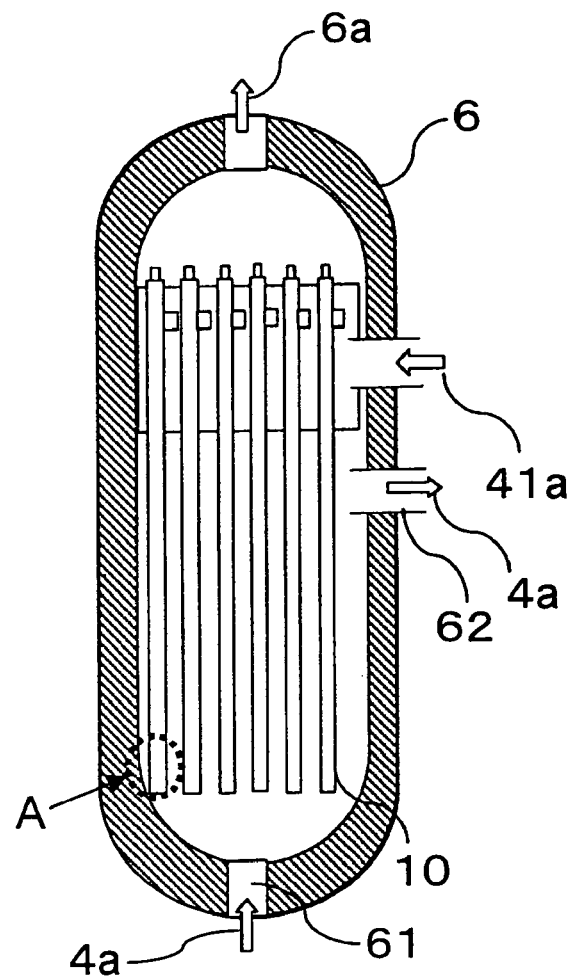
FIG. 4A is a schematic illustration of the steam reformer of FIG. 1 in longitudinal cross section.
Figure 4B:
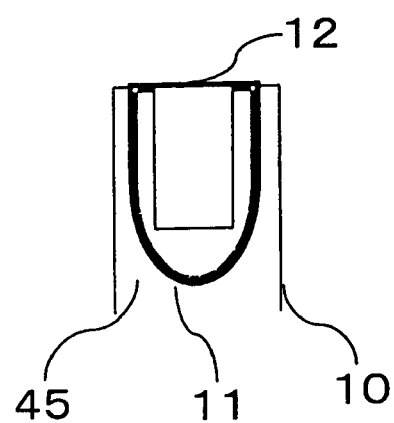
FIG. 4B is an enlarged schematic cross sectional view of part A in FIG. 4A.

FIG. 4A is a schematic longitudinal cross sectional view of the steam reformer 6 of FIG. 1, illustrating the structure thereof. FIG. 4B is an enlarged schematic cross sectional view of part A in FIG. 4A.

As shown in the drawings, a plurality of helium flow channel pipes 10 are suspended in the inside of the steam reformer 6 so as to contact with the secondary system helium gas 4a. A reaction tube 11 is inserted into each of the helium flow channel pipes 10 to receive raw material gas 41a flowing into it. The reaction tubes 11 contain therein respective inner bayonet tubes 12, through which produced hydrogen 6a flows.

High temperature secondary system helium gas 4a is introduced from a lower part 61 of the steam reformer 6. The introduced secondary system helium gas 4a exchanges heat as it contacts the helium flow channel pipes 10 and then flows out by way of the piping in a middle part 62 of the steam reformer 6.

As described above, the helium flow channel pipes 10 are heated by the secondary system helium gas 4a. As a result of being heated, raw material gas 41a and steam react with each other to produce hydrogen 6a as manufactured hydrogen in the reaction tubes 11 contained in the helium flow channel pipes 10. The manufactured hydrogen 6a is collected by way of the inner bayonet tubes 12.

With this embodiment, when secondary system helium gas 4a shown in FIG. 1 contains tritium 45 produced as a result of neutron irradiation in the high temperature gas reactor 2, the tritium 45 moves by way of the reaction tubes 11 so that the manufactured hydrogen 6a contains tritium. For this reason, at least either the inner surface or the outer surface of the reaction tubes 11 of the metal-made internal structure indicated by thick solid lines in FIG. 4B is coated with amorphous ceramic.

A material selected from stainless steel such as SUS316L, Ni-based alloys such as Hasteloy, Ti and Ti alloys is preferably used for the reaction tubes 11 from the viewpoint of strength and corrosion resistance. A ceramic material selected from SiC, $Al_2O_3$ or $ZrO_4$ is preferably used for the coating because such materials show low tritium permeability.

With this embodiment, it is possible to suppress movement of tritium into the hydrogen 6a by coating the reaction tubes 11 of the metal-made internal structure with a ceramic material that suppresses diffusion of tritium such as amorphous ceramic.

Techniques for coating with ceramic will be described below. Techniques that can be used for coating with ceramic include chemical vapor deposition (to be referred to as CVD hereinafter), plasma spraying and ion plating.

Figure 5:
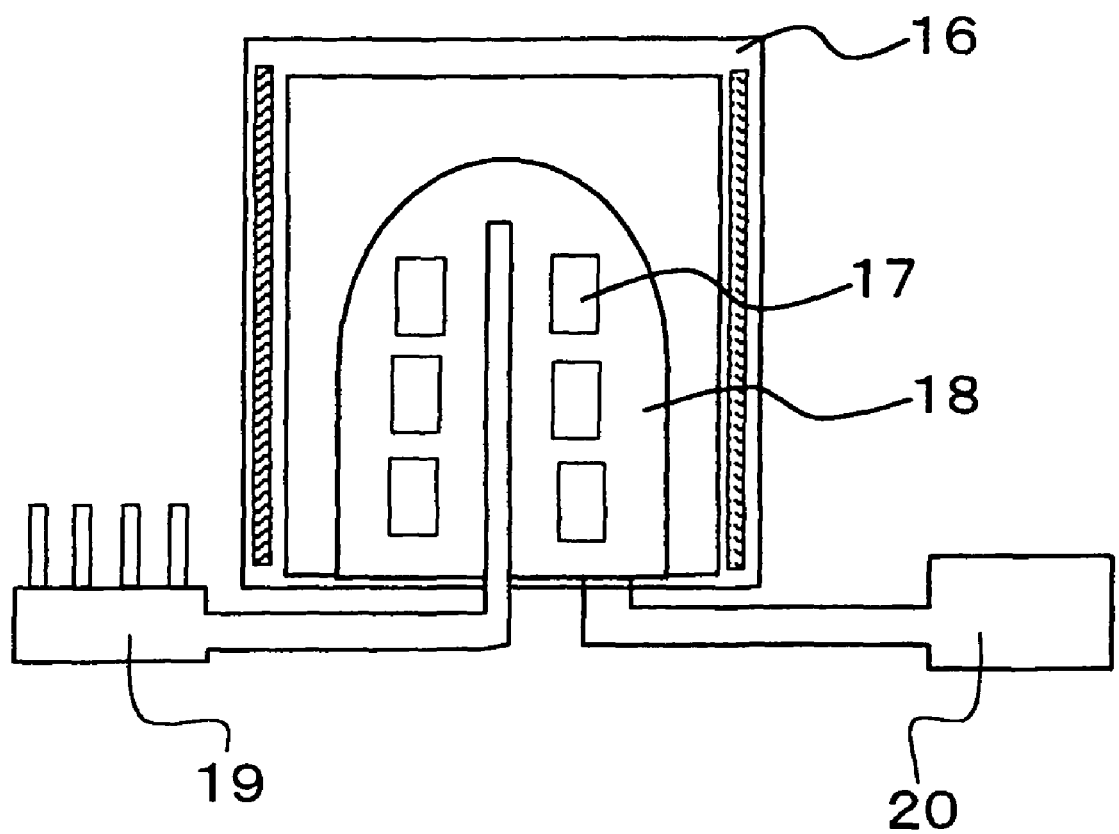
FIG. 5 is a schematic longitudinal cross sectional view of an apparatus for coating with ceramic by CVD, illustrating the structure thereof.

FIG. 5 is a schematic longitudinal cross sectional view of an apparatus for coating with ceramic by CVD, illustrating the structure thereof.

As shown in FIG. 5, the apparatus for coating with ceramic by CVD has a heating furnace 16. A reactor 18 is arranged in the inside of the heating furnace 16. The reactor 18 is connected to a vacuum pump 20 by way of a piping and also connected to a gas mixture tank 19 by way of another piping. An object 17 to be coated with ceramic is arranged in the inside of the reactor 18.

With this embodiment, mixture gas containing one or more than one ceramic elements (Si, Al, Zr, etc.) is fed into the reactor 18 from the gas mixture tank 19 while the reactor 18 is heated by the heating furnace 16. At the same time, the object 17 is coated with the ceramic element or elements, operating the vacuum pump 20 and adjusting the degree of vacuum in the inside of the reactor 18.

Thus, with this embodiment, it is possible to suppress permeation of tritium by coating at least either the inner surface or the outer surface of the metal-made internal structures such as the secondary system helium gas flow channel 14 of the intermediate heat exchanger 3 and the reaction tubes 11 of the steam reformer 6 with ceramic that show low tritium permeability.

Figure 6:
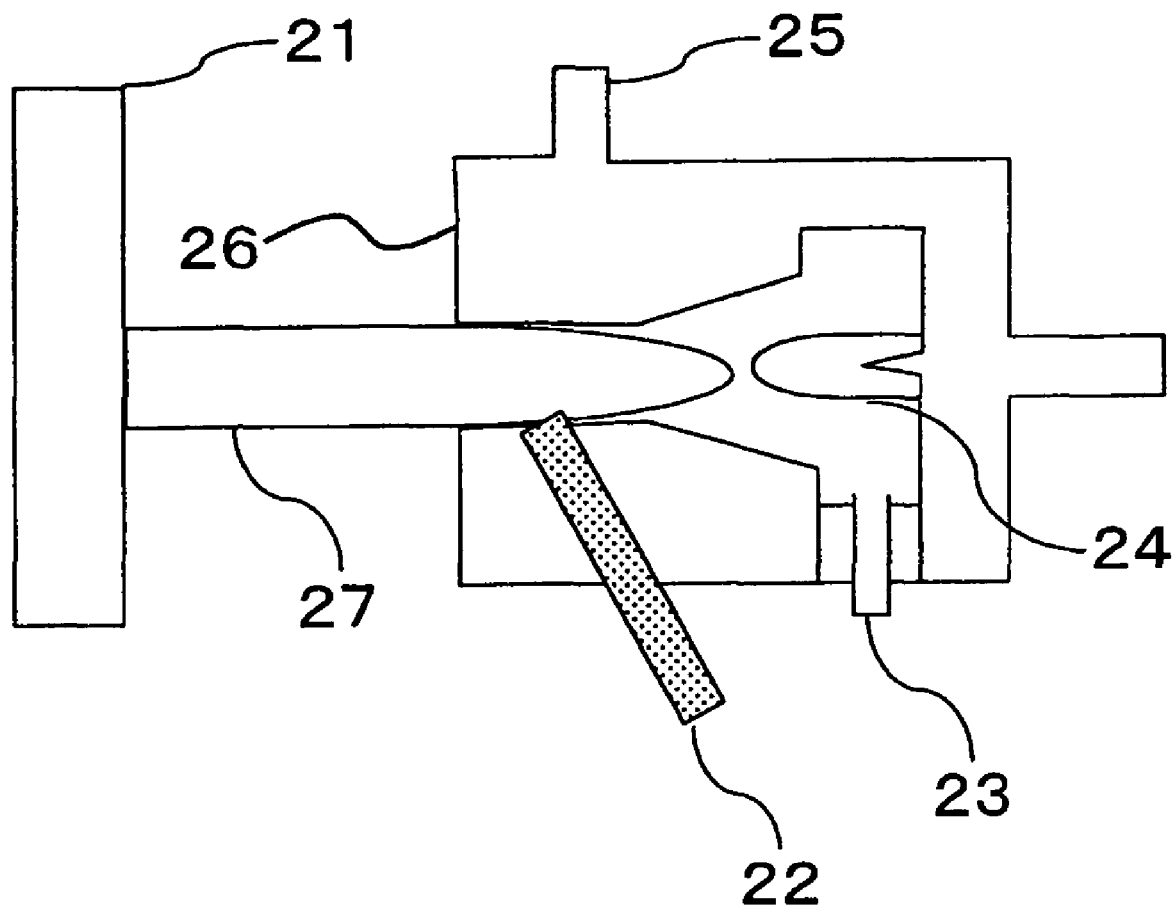
FIG. 6 is a schematic longitudinal cross sectional view of an apparatus for coating with ceramic by plasma spraying, illustrating the structure thereof.

FIG. 6 is a schematic longitudinal cross sectional view of an apparatus for coating with ceramic by plasma spraying, illustrating the structure thereof.

As shown in FIG. 6, the apparatus for coating with ceramic by plasma spraying has a cathode 24 and an anode 26. As the cathode 24 and the anode 26 are electrically energized, a powdery material 22 is heated and dissolved by working gas 23. A plasma jet 27 containing the heated and dissolved powdery material 22 is blown. Then, the surface of an object 21 is coated with ceramic as the plasma jet 27 is blown onto the surface of the object 21. The inside of the apparatus for coating with ceramic by plasma spraying is cooled by cooling water 25.

As described above, it is possible to suppress permeation of tritium by coating with ceramic having low tritium permeability in the form of a powdery material 22.

Figure 7:
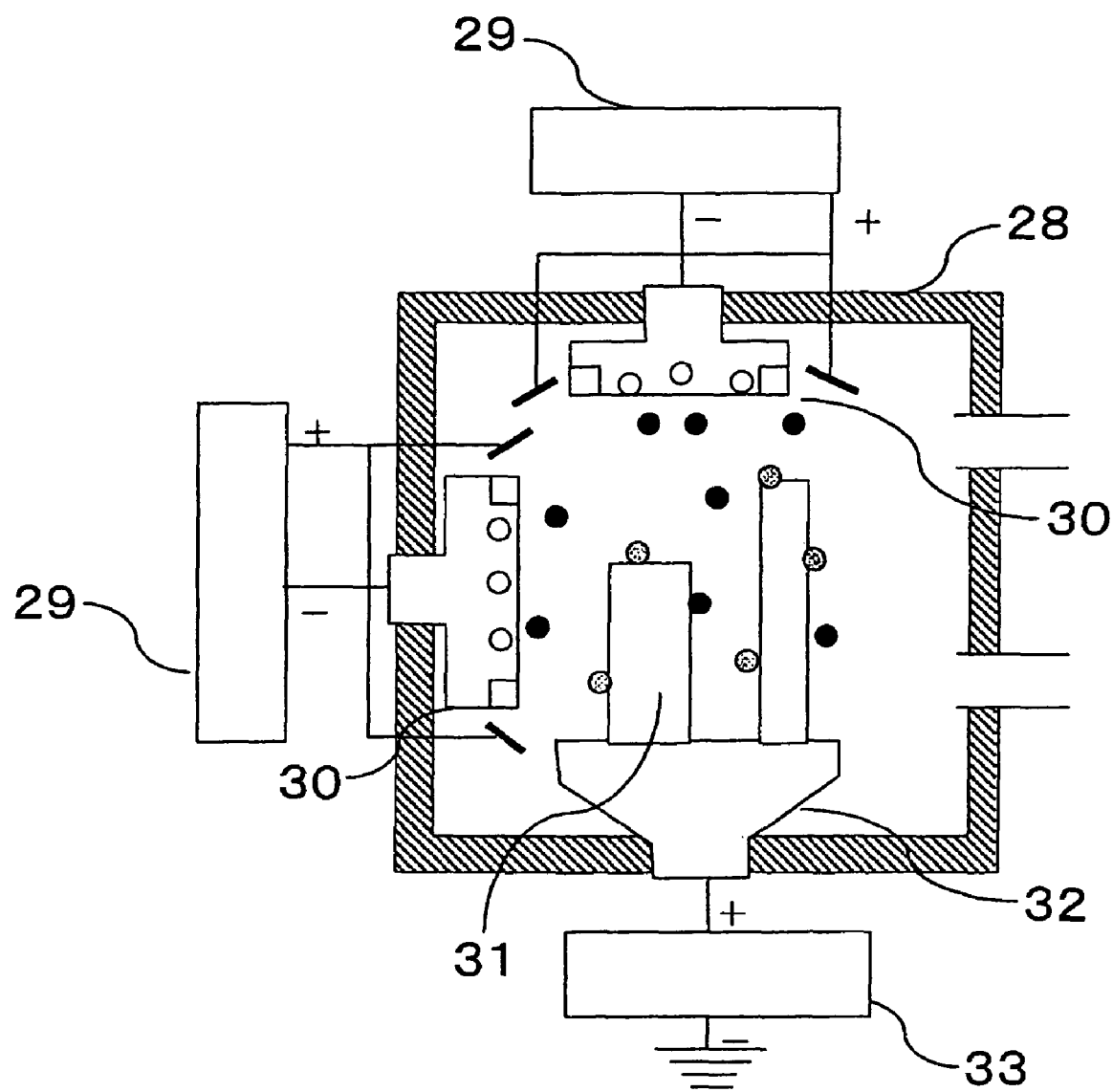
FIG. 7 is a schematic longitudinal cross sectional view of an apparatus for coating with ceramic by ion plating, illustrating the structure thereof.

FIG. 7 is a schematic longitudinal cross sectional view of an apparatus for coating with ceramic by ion plating, illustrating the structure thereof.

As shown in FIG. 7, the apparatus for coating with ceramic by ion plating has a vacuum chamber 28. Evaporation sources 30 are arranged on the inner surface of the vacuum chamber 28 respectively at an upper part and a middle height part thereof. The evaporation sources 30 are connected respectively to external arc current sources 29. A turntable 32 is arranged in the inside of the vacuum chamber 28. An object 31 to be coated is mounted on the turntable 32. A bias voltage source 33 arranged outside the vacuum chamber 28 is connected to the turntable 32.

With the above-described arrangement, molecules and atoms of the raw material that are evaporated in the process gas under low pressure that is close to vacuum are ionized and exited. A high negative voltage is applied to the ions and the particles that are in a neutral state, so that at least either the inner surface or the outer surface of the metal-made internal structure that is the object is coated with ceramic that suppresses permeation of tritium.

In this way, it is possible to manufacture hydrogen, suppressing permeation of tritium, by coating at least either the inner surface or the outer surface of the metal-made internal structures such as the secondary system helium gas flow channel 14 of the intermediate heat exchanger 3 and the reaction tubes 11 of the steam reformer 6 with ceramic that show low tritium permeability.

The above-described techniques for coating with ceramic are only examples and the present invention is by no means limited thereto. For instance, a plurality of techniques selected from CVD, plasma spraying and ion plating may be appropriately combined for coating with ceramic that suppresses permeation of tritium depending on the part that is the object to be coated.

Figure 10:
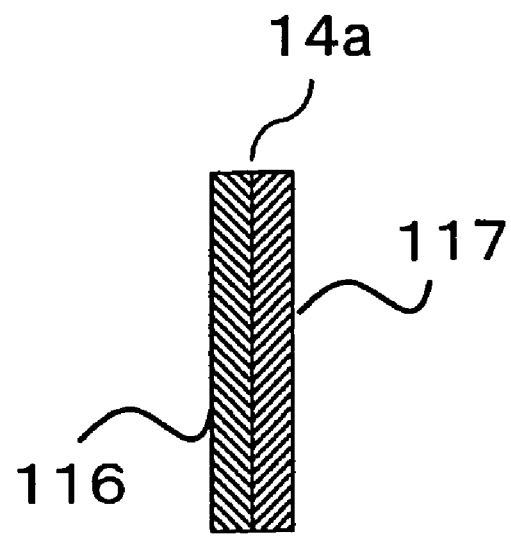
FIG. 10 is a schematic illustration of another embodiment of intermediate heat exchanger, showing an enlarged cross sectional view of part X of FIG. 2.

Now, another embodiment of hydrogen manufacturing apparatus and method thereof will be described below. This embodiment is common with the above-described embodiment in terms of the schematic system of the hydrogen manufacturing apparatus shown in FIG. 1, the structure of the intermediate heat exchanger shown in FIG. 2 and that of the steam reformer shown in FIGS. 4A and 4B. In this embodiment, the internal structure (illustrated by thick solid lines) that constitutes the secondary system helium gas flow channel 14 of the intermediate heat exchanger shown in FIG. 2 is formed by a component member prepared by combining two or more than two types of metal materials having different crystal structures as shown in FIG. 10. Alternatively, a metal material having an oxide film coat adhering to it may be used.

With this embodiment, it is possible to achieve an effect of suppressing movement of tritium as will be described hereinafter by using a component member prepared by combining two or more than two types of metal materials having different crystal structures. The material may typically be selected from stainless steel, nickel-based alloys, Ti alloys and molybdenum.

Figure 8:
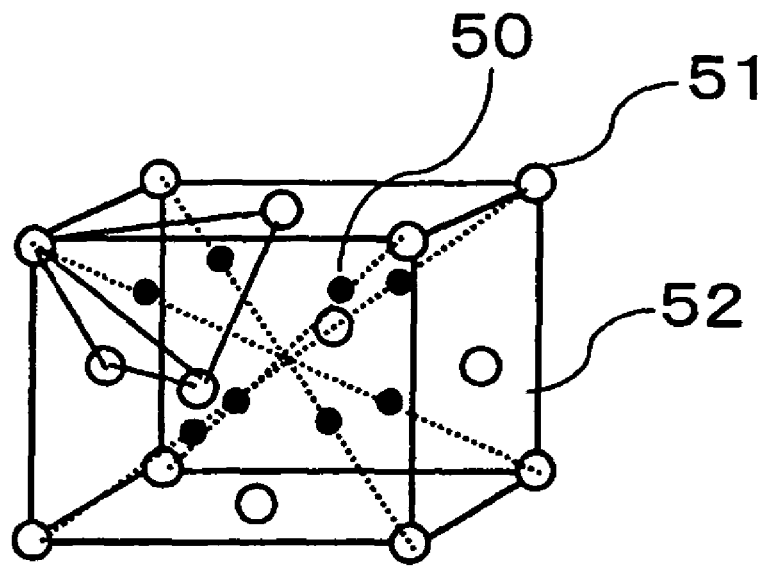
FIG. 8 is a schematic illustration of the positions where hydrogen is found that can be differentiated due to the crystal structure, showing the positions where hydrogen is found in a face-centered cubic lattice (fcc)
Figure 9:
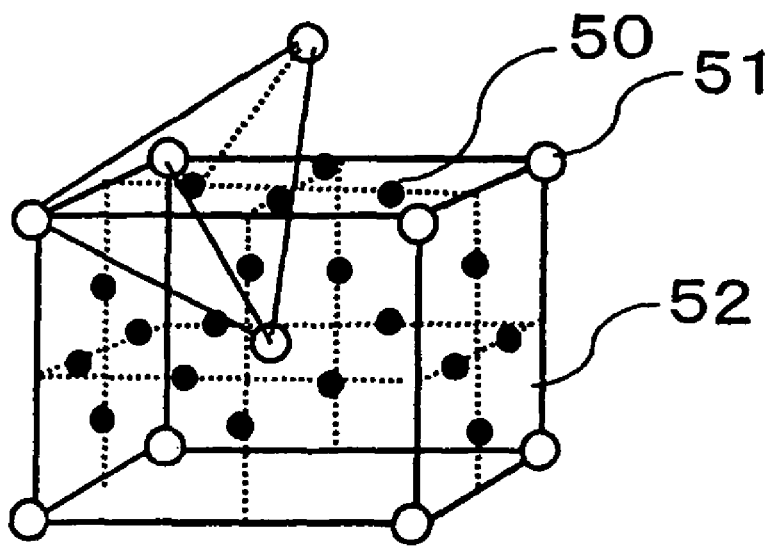
FIG. 9 is a schematic illustration of the positions where hydrogen is found that can be differentiated due to the crystal structure, showing the positions where hydrogen is found in a body-centered cubic lattice (bcc)

FIGS. 8 and 9 are schematic illustrations of the positions where hydrogen 50 is found that can be differentiated due to the crystal structure of metal. FIG. 8 shows the positions where the hydrogen 50 is found in a face-centered cubic lattice (fcc). FIG. 9 shows the positions where the hydrogen 50 is found in a body-centered cubic lattice (bcc).

As seen from the drawings, the hydrogen 50 (indicated by "●") is found in a metal material at positions in interstitial spaces 52 formed by metal atoms 51 (indicated by "○") but do not stand still and constantly moving through the interstitial spaces 52. The positions of the hydrogen 50 differ depending on the crystal lattice. Since the hydrogen 50 moves through the interstitial spaces 52, the move of the hydrogen is made difficult when different lattice materials are combined. Additionally, the diffusion velocity of the hydrogen 50 is reduced when the distance of the interstitial space 52 is prolonged because the active energy necessary for a move rises high. Therefore, it is possible to suppress diffusion of the hydrogen 50 and hence that of the tritium 45 by combining metal materials having different crystal structures for use. Since the tritium 45 is isotope of the hydrogen 50 and shows characteristics same as the hydrogen 50, it is possible to suppress behaviors of the tritium 45 by suppressing behaviors of the hydrogen 50.

For this embodiment, stainless steel and nickel-based alloys have a body-centered cubic lattice (fcc) while molybdenum has a face-centered cubic lattice (bcc). An oxide film coat mainly containing Fe, Ni and Cr has a trigonal system or cubic system structure. Thus, it is possible to suppress diffusion of hydrogen by combining two or more than two types of materials and/or oxide films showing such crystal structures.

With this embodiment, as shown in FIG. 10, molybdenum is arranged for the inner layer 116 and stainless steel is arranged for the outer layer 117 of the internal structure (illustrated by thick solid lines) that constitutes the secondary system helium gas flow channel 14 and then the two layers are bonded together. In this way, materials showing different crystal structures are arranged. For example, a component member prepared by combining two types of metal materials having different crystal structures may be used. Alternatively; a metal material with an oxide film coat adhering thereto may be used.

When materials having different crystal structures are used in such a way that, for example, molybdenum is arranged for the inner layer 116 and stainless steel is arranged for the outer layer 117 of the internal structure (illustrated by thick solid lines) 14a that constitutes the secondary system helium gas flow channel 14 and are bonded together, it becomes difficult for hydrogen to move from molybdenum to stainless steel, so that it can hardly diffuse to the outside.

As metal materials, alternatively, molybdenum may be arranged for the inner layer 116 and nickel-based alloy may be arranged for the outer layer 117. Still alternatively, stainless steel or nickel-based alloy may be arranged for the inner layer 116 and an oxide film coat mainly made of Fe, Cr or Ni may be arranged for the outer layer 117 to achieve a similar effect.

Figure 11:
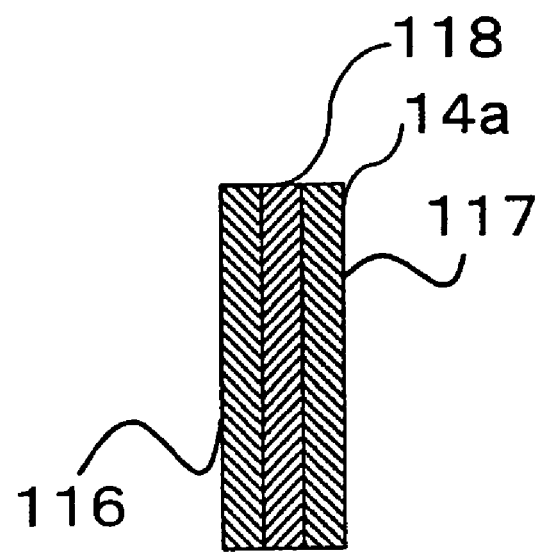
FIG. 11 is a schematic illustration of still another embodiment of intermediate heat exchanger, showing an enlarged cross sectional view of part XI of FIG. 2.

Now, still another embodiment of hydrogen manufacturing apparatus and method thereof will be described below. With this embodiment, the internal structure (illustrated by thick sold lines) 14a that constitutes the secondary system helium gas flow channel 14 in the intermediate heat exchanger shown in FIG. 2 is formed by a component member prepared by combining three types of metal materials having different crystal structures as shown in FIG. 11. Alternatively, a metal material having oxide film coats adhering to it may be used.

As shown in FIG. 11, the structure 14a has a three-layer structure of an inner layer 116, a middle layer 118 and an outer layer 117. Stainless steel is arranged for the inner layer 116 and molybdenum is arranged for the middle layer 118 while a nickel-based alloy is arranged for the outer layer 117.

With this embodiment having a three-layer structure where stainless steel is arranged for the inner layer 116 and molybdenum is arranged for the middle layer 118 while a nickel-based alloy is arranged for the outer layer 117, it is possible to further suppress diffusion of hydrogen. Additionally, it is possible to improve the strength of the component member.

The above-described three-layer structure of stainless steel, molybdenum and a nickel-based alloy may be replaced by a three-layer structure of stainless steel, molybdenum and a nickel-based alloy arranged in the above mentioned order from the inner layer to the outer layer to achieve a similar effect.

The component member may be modified to show a three-layer structure of stainless steel, molybdenum and stainless steel, a three-layer structure of a nickel-based alloy, molybdenum and a nickel-based alloy; a three-layer structure of molybdenum, stainless steel and molybdenum; or a three-layer structure of molybdenum, a nickel-based alloy and molybdenum arranged in the above mentioned order from the inner layer to the outer layer.

The present invention is by no means limited to the above described embodiments, which should be regarded as so many examples.

For instance, while a two-layer structure and a three-layer structure are shown respectively in FIGS. 10 and 11, a multilayer structure having more than three layers may alternatively be used. While the multilayer structures shown in FIGS. 10 and 11 are described above so as to be adopted to the heat conducting section of the intermediate heat exchanger, a similar structure may be used for the heat conducting section of the steam reformer.

The characteristics of the above-described embodiments may be combined in various different ways.

What is claimed is:

1. A hydrogen manufacturing apparatus for manufacturing hydrogen by utilizing heat generated in a nuclear plant, the apparatus comprising:
    a metal-made intermediate heat exchanger configured to be brought into contact with a primary system coolant containing tritium produced from the nuclear plant to transfer heat to a secondary system coolant; and
    a metal-made steam reformer configured to manufacture hydrogen from raw material gas and water heated by the secondary system coolant;
    wherein at least either an outer surface or an inner surface of at least either the intermediate heat exchanger or the steam reformer is coated with a tritium permeation suppressing ceramic.

2. The apparatus according to claim 1, wherein the intermediate heat exchanger or the steam reformer, the outer surface or the inner surface of which is coated with tritium permeation suppressing ceramic, is formed by using at least a material selected from the group consisting of stainless steel, a Ni-based alloy, Ti and a Ti alloy.

3. The apparatus according to claim 1, wherein the tritium permeation suppressing ceramic is formed by an amorphous ceramic.

4. The apparatus according to claim 1, wherein the tritium permeation suppressing ceramic is formed by using at least a material selected from the group consisting of SiC, $Al_2O_3$ and $ZrO_4$.

5. The apparatus according to claim 1, wherein the tritium permeation suppressing ceramic is produced by coating the outer surface or the inner surface of the intermediate heat exchanger or the steam reformer with the ceramic by at least a technique selected from the group consisting of chemical vapor deposition, plasma spraying and ion plating.

6. The apparatus according to claim 1, wherein N+ is located at contact surfaces between the intermediate heat exchanger or the steam reformer and the tritium permeation suppressing ceramic.

7. The apparatus according to claim 1, wherein the metal material is formed by adhering an oxide film coat mainly containing iron or chromium to the surface of stainless steel.

8. The apparatus according to claim 1, wherein the tritium permeation suppressing ceramic is formed on the outer surface or inner surface of the intermediate heat exchanger.

9. A method of manufacturing hydrogen by utilizing heat generated in a nuclear plant, the method comprising:

a tritium introduction step of introducing a cooling material containing tritium produced from the nuclear plant into a metal-made internal structure; and a tritium permeation suppression step of suppressing permeation of the introduced tritium by way of a permeation suppressing ceramic coated on at least either the inner surface or the outer surface of the metal-made internal structure.

* * * * *